US009053059B2

(12) United States Patent
Scott-Nash (10) Patent No.: US 9,053,059 B2
(45) Date of Patent: Jun. 9, 2015

(54) ROOTS-OF-TRUST FOR MEASUREMENT OF VIRTUAL MACHINES (71) Applicant: INTEL CORPORATION, Santa Clara, CA (US)

(72) Inventor: Mark E. Scott-Nash, Boulder, CO (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 13/997,138

(22) PCT Filed: Mar. 6, 2013

(86) PCT No.: PCT/US2013/029439
§ 371 (c)(1),
(2) Date: Jun. 21, 2013

(87) PCT Pub. No.: WO2014/137338
PCT Pub. Date: Sep. 12, 2014

(65) Prior Publication Data
US 2014/0258733 A1 Sep. 11, 2014

(51) Int. Cl.
G06F 7/04 (2006.01)
G06F 12/14 (2006.01)
G06F 21/64 (2013.01)
G06F 9/455 (2006.01)

(52) U.S. Cl.
CPC .......... G06F 12/1408 (2013.01); G06F 21/64 (2013.01); G06F 9/455 (2013.01)

(58) Field of Classification Search
CPC ............... G06F 2009/45587; G06F 12/1408; G06F 21/64

USPC ............................................................ 726/2
See application file for complete search history.

(56) References Cited

U.S. PATENT DOCUMENTS 8,074,262 B2 * 12/2011 Scarlata ........................ 726/4
(Continued)

FOREIGN PATENT DOCUMENTS

WO   WO2012-148255 A1   11/2012

OTHER PUBLICATIONS

International Search Report and Written Opinion mailed Dec. 9, 2013 for International Application No. PCT/US2013/029439, 11 pages.
Office Action mailed Mar. 14, 2014 for U.S. Appl. No. 13/537,347, 15 pages.

(Continued)

Primary Examiner — Teshome Hailu
(74) Attorney, Agent, or Firm — Schwabe, Williamson & Wyatt, P.C.

(57) ABSTRACT

Embodiments of techniques and systems associated with roots-of-trust (RTMs) for measurement of virtual machines (VMs) are disclosed. In some embodiments, a computing platform may provide a virtual machine RTM (vRTM) in a first secure enclave of the computing platform. The computing platform may be configured to perform an integrity measurement of the first secure enclave. The computing platform may provide a virtual machine trusted platform module (vTPM), for a guest VM, outside the first secure enclave of the computing platform. The computing platform may initiate a chain of integrity measurements between the vRTM and a resource of the guest VM. Other embodiments may be described and/or claimed.

17 Claims, 5 Drawing Sheets

(56) References Cited

U.S. PATENT DOCUMENTS

| | | |
|---|---|---|
| 2003/0115453 A1 | 6/2003 | Grawrock |
| 2007/0056033 A1 | 3/2007 | Grawrock |
| 2007/0094719 A1* | 4/2007 | Scarlata ............................ 726/9 |
| 2007/0234412 A1 | 10/2007 | Smith et al. |
| 2008/0244569 A1 | 10/2008 | Cahllener et al. |
| 2009/0204964 A1 | 8/2009 | Foley et al. |
| 2012/0151209 A1* | 6/2012 | Visnyak et al. ............... 713/166 |
| 2014/0007087 A1 | 1/2014 | Scott-Nash et al. |

OTHER PUBLICATIONS

Frederic Stumpf, "Enhancing Trusted Platform Modules with Hardware-Based Virtualization Techniques", Aug. 2008, 978-0-7695-3329-2, Univ. Darmstadt, Darmstadt, 9 pages.

"TPM Main Part 1 Design Principles", Specification Version 1.2, Revision 116, Mar. 1, 2011, TCG Published, 184 pages.

Sangster, Paul et al. "Virtualized Trusted Platform Architecture Specification", Specification Version 1.0, Revision 0.26, Sep. 27, 2011, TCG Published, 60 pages.

* cited by examiner

ROOTS-OF-TRUST FOR MEASUREMENT OF VIRTUAL MACHINES

CROSS REFERENCE TO RELATED APPLICATIONS

The present application is a national phase entry under 35 U.S.C. §371 of International Application No. PCT/US2013/029439, filed Mar. 6, 2013, entitled "ROOTS-OF-TRUST FOR MEASUREMENT OF VIRTUAL MACHINES", which designated, among the various States, the United States of America. The Specification of the PCT/US2013/029439Application is hereby incorporated by reference.

TECHNICAL FIELD

The present disclosure relates generally to the field of computing systems, and more particularly, to secure computing platforms.

BACKGROUND

In some security models, one or more roots-of-trust are used to support a trusted computing platform. For example, in some of the security models presented by the Trusted Computing Group, three roots-of-trust are used: a root-of-trust for storage (RTS), a root-of-trust for reporting (RTR) and a root-of-trust for measurement (RTM). The locations of these roots-of-trust within a computing platform may vary. Some computing platforms, for example, include the RTR and the RTS in a Trusted Platform Module (TPM), a physical component (typically a chip) that acts to detect tampering with the hardware and software configuration. The RTM in such a platform, however, may be provided by platform firmware. In particular, when such a computing platform begins to boot, a core RTM (cRTM), implemented in an immutable form such as ROM in the pre-BIOS of the device, measures the next set of code to be executed, cryptographically hashes this measurement, and stores the hash digest value in the TPM. Control is passed to this next set of code, which then measures the subsequent set of code and stores a hash digest value of the measurement in the TPM. This chain of measurement continues until boot is complete and the OS is loaded. Changes in the configuration of the boot stages (due to, e.g., malware or tampering) may be detected by comparing the stored hash values in the TPM against their previous values. The cRTM, as the initial measuring component, is not measured before execution and is assumed to be correct by design.

In a virtualized environment, a guest virtual machine (VM) runs in a software-based environment provided by a virtual machine manager (VMM, also called a hypervisor). The environment may include VMs that provide virtualized versions of a number of physical components of traditional computing platforms, such as drivers for hardware, and VMs that provide support functions for VM maintenance, such as VMs that can manipulate the memory of a guest VM. Some previous work has applied the TPM concept to virtualized systems and developed a virtual machine TPM (vTPM). In some such systems, each guest VM may be associated with its own vTPM, which serves as the RTS and RTR for the chain of measurements of the associated guest VM. An RTM, which may measure VMs and other software components that support the vTPM, may be implemented as VM on the same hypervisor. However, such an RTM is just as susceptible as the vTPM to tampering, and is entirely reliant on the trustworthiness of the hypervisor. This may result in an overly large trusted computing base, and as a result, vulnerability to security breaches in the hypervisor or other components.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Embodiments of techniques and systems associated with roots-of-trust (RTMs) for measurement of virtual machines (VMs) are disclosed. In some embodiments, a computing platform may provide a virtual machine RTM (vRTM) in a first secure enclave (SE) of the computing platform. The computing platform may be configured to perform an integrity measurement of the first SE. The computing platform may provide a virtual machine trusted platform module (vTPM), for a guest VM, outside the first SE of the computing platform. The computing platform may initiate a chain of integrity measurements between the vRTM and a resource of the guest VM.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description uses the phrases "in an embodiment," or "in embodiments," which may each refer to one or more of the same or different embodiments. Furthermore, the terms "comprising," "including," "having," and the like, as used with respect to embodiments of the present disclosure, are synonymous. As used herein, the terms "module" or "logic" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
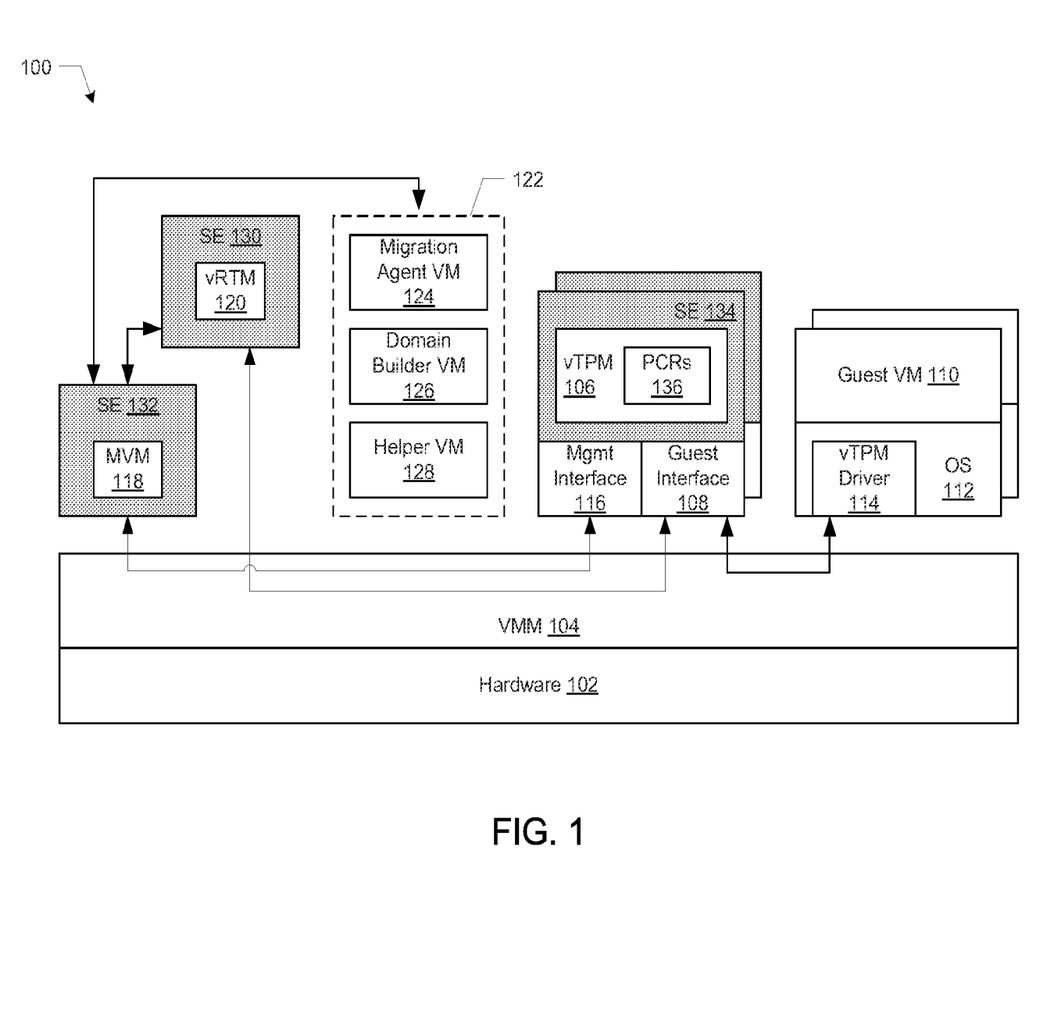
FIG. 1 is a block diagram of a computing platform including a virtual machine root-of-trust for measurement (vRTM) in a secure enclave (SE), in accordance with various embodiments.

Referring now to FIG. 1, a computing platform including a vRTM in an SE is illustrated, in accordance with various embodiments.

Computing platform 100 may include hardware 102. Hardware 102 may include, for example, one or more processing devices and memory devices (e.g., system memory, a cache memory, a microprocessor-based memory, a memory internal to a processor, a memory external to a processor). In some embodiments, computing platform 100 may include a communication interface through which computing platform 100 may conununicate with other computing platforms or devices. Further examples of hardware that may be included in hardware 102 of computing platform 100 are discussed below with reference to FIG. 6. Hardware 102 may also include firmware and microcode of computing platform 100. For example, microcode may detine the operation of assembly language instructions, and thus may influence the operation of hardware components in ways that are not modifiable by the end user of computing platform 100.

Computing platform 100 may include virtual machine monitor (VMM) 104. VMM 104 may virtualize hardware 102 of computing platform 100 to provide virtual operating platforms to allow VMs (such as vRTM 120, vTPM 106, guest VM 110, among others) to execute, or run, concurrently on computing platform 100. Each VM running on VMM 104 may perceive its virtual operating platform as a physical platform. Although certain components of computing platform 100 may be described as "guest VMs," the term "guest VM" may include any VM executing on VMM 104 which may be measured by vRTM 120 (including, e.g., support VMs 122).

Computing platform 100 may include vTPM 106. In some embodiments, computing platform 100 may include multiple vTPMs like vTPM 106, which may each be associated with one or more guest VMs like guest VM 110 (discussed below). For ease of illustration, much of the present disclosure will discuss a single vTPM, but all of the systems and techniques disclosed herein are suitable for use with multiple vTPMs. vTPM 106 may include guest interface module 108, which may be configured to facilitate communication between vTPM 106 and guest VM 110. vTPM 106 may include management interface module 116, which may be configured to facilitate communication between vTPM 106 and management VM (MVM) 118 (discussed below).

vTPM 106 may be disposed in SE 134. As used herein, an SE (such as SE 134) may include a set of memory locations that provides a safe place in which a module (such as a VM) may execute instructions of machine-readable code and store data. An SE may thus provide a mechanism for hardware 102 of computing platform 100 to protect certain memory locations (such as vTPM 106 in SE 134). In particular, SE 134 may protects the secrets of vTPM 106 from any firmware of computing platform 100, VMM 104, and/or other processes that are executing on computing platform 100. The contents of SEs may also be measured and stored so that changes to the contents may be readily detected.

A number of example embodiments of SEs are now described. In some embodiments, VMs in an SE may be run from an enclave page cache, and enclave pages may be loaded into the enclave page cache by an operating system (OS) of computing platform 100. In some embodiments, an SE may be initialized by a VMM or a VM running on a VMM (e.g., Domain 0 in the Xen Hypervisor). Whenever a page of a VM in an SE is removed from the enclave page cache, cryptographic protections may be used to protect the confidentiality of the page and to detect tampering when the page is loaded back into the enclave page cache. Inside the enclave page cache, enclave data may be protected using access control mechanisms, which are provided by processing devices of hardware 102, and the pages of the page cache may also be encrypted.

In some embodiments, code for a VM in an SE may be temporarily stored in an encrypted state in an enclave page cache. The VM code may be fetched from the enclave page cache, decrypted and placed in a processing device cache, from which the code may be retrieved and executed, and where enclave data is accessed by processing device(s) of computing platform 100. In some embodiments, an enclave page cache may be located within the physical address space of computing platform 100, and the enclave page cache may be accessed solely through the use of SE instructions, which are a subset of instructions executed by processing device(s) of hardware 102. An enclave page cache may contain pages from many different SEs and may provide access control mechanisms to protect the integrity and confidentiality of the pages. An enclave page cache may maintain a coherency protocol similar to those that may be used to preserve coherent physical memory accesses in a computing platform.

In some embodiments, an enclave page cache may use an enclave page cache map, which may contain the state information associated with each page in the enclave page cache. The state information may indicate information such as the particular enclave to which a given page belongs, the state of a loaded page, and so forth. When a page is removed from the enclave page cache, an integrity measurement may be performed on the SE by exporting and protecting (using cryptographic techniques) the state information from the enclave page cache map. Similarly, when a given enclave page is re-loaded into the enclave page cache, the state information may be verified. In various embodiments, an enclave page cache may be stored in different types of memories (e.g., on board static random access memory (SRAM) of a particular processing device, and/or as part of a dynamic random access memory (DRAM) that is disposed on or separate from a processing device). In various embodiments, the enclave page cache may be protected from unauthorized accesses from outside computing platform 100, while allowing other components of computing platform 100 to access the enclave page cache coherently yet securely.

In some embodiments, an enclave page cache may be a cryptographic memory aperture, which may provide a relatively cost-effective mechanism of creating cryptographically protected volatile storage using DRAM. A cryptographic memory aperture may use one or more strategically-placed cryptographic units in a region outside of a processing core of a central processing unit (CPU) of hardware 102 to provide varying levels of protection. The various agents outside the processing core may be modified to recognize the memory accesses going to the cryptographic memory aperture and to route these accesses to a cryptographic controller located in the processing core. A cryptographic controller, depending on the desired protection level, may generate one or more memory accesses to the platform DRAM to fetch the cipher text. The fetch text may then be processed by the cryptographic controller to generate the plain text to satisfy the original cryptographic memory aperture request.

In some embodiments, an enclave page cache may be kept as a separate container, which may be managed by microcode included in hardware 102. In this manner, the container may not be accessible when execution is outside of the SE. When an SE (such as SE 134) is entered, control may be transferred to the enclave code inside the enclave page cache, which may be contained in a separate container. Any page faults or exceptions that occur while executing inside of an SE may be reflected by the microcode to an OS of computing platform 100 and/or to VMM 104. When computing platform 100 is executing outside of any of an SE, access control to the enclave page cache may be provided by a SE range register of hardware 102. Computing platform 100 may thus, when running inside the microcode, provide page table level protections that prevent access to other SE page cache entries that do not belong to the executing SE. In some embodiments, implementing an SE may include implementing the instructions and the protections using the microcode capability of a processing device of hardware 102.

In addition to the above-described advantages and features of various embodiments of SEs, a number of design considerations may also inform how SEs may be used in a computing platform. For example, third-party hardware and devices (such as, e.g., network interface cards) may not be configured for communication with VMs or other applications running inside SEs, and thus even though such devices may interface correctly with VMs and applications running outside an SE, such devices may not interface correctly with VMs or other applications running inside SEs. Additionally, the security features involved in various embodiments of SEs may require substantial overhead (e.g., in terms of memory and processor cycles for key management), and thus the choice of which, if any, VMs or other applications may appropriately be contained in an SE may require a consideration of speed, memory access, and other issues.

Still referring to FIG. 1, in some embodiments, computing platform 100 may include multiple vTPMs like vTPM 106, which may each be disposed in a different SE. In some embodiments, vTPM may not be disposed in an SE. vTPM 106 may be configured to store cryptographic information. In some embodiments, vTPM 106 may store a private key of a private and public key pair (such as a Rivest-Shamir-Adelman (RSA) key pair, or a private and public attestation key pair), which may uniquely identify vTPM 106, and/or certificates signed with such keys. The keys of vTPM 106 may not leave the boundaries of SE 134; when a guest VM associated with vTPM 106 (e.g., guest VM 110) is migrated, vTPM 106 may carry the cryptographic information between platforms.

vTPM 106 may include platform configuration registers (PCRs) 136. In some embodiments, PCRs 136 may be configured to store one or more integrity measurements of a chain of integrity measurements between vRTM 120 (discussed below) and one or more resources of guest VMs supported by vTPM 106 (e.g., guest VM 110, discussed below). When an integrity measurement of a particular guest VM resource is performed, the integrity measurement may be stored in a particular PCR associated with that guest VM resource. When a chain of integrity measurements is initiated again, vTPM 106 may receive a command (e.g., from vRTM 120) to change the value stored in the particular PCR. In some embodiments, such a command may include a command to extend the value stored in the particular PCR with a cryptographic hash of the new integrity measurement. As used herein, "extending" an existing value with a new value may include concatenating the existing value with the new value, and hashing the result (e.g., using an SHA-1 hash). In this manner, a history of integrity measurements for guest VM resources may be maintained in PCRs 136. In some embodiments, a value stored in one or more of PCRs 136 may only be changed when allowed by MVM 118, as discussed below.

Computing platform 100 may include guest VM 110. In some embodiments, computing platform 100 may include multiple guest VMs like guest VM 110; much of the present disclosure will discuss a single guest VM for ease of illustration. Guest VM 110 may include vTPM driver 114, which may be configured to facilitate communication between guest VM 110 and guest interface module 108 of vTPM 106. In some embodiments, communication between vTPM driver 114 and guest interface module 108 may take place through VMM 104. vTPM driver 114 may be controlled by operating system (OS) 112, which may run on guest VM 110. OS 112 may control a number of other drivers for physical and/or virtual devices (e.g., physical and/or virtual printers, display devices, or communication devices). OS 112 may also support a number of applications, which may run on guest VM 110 as if guest VM 10 were an isolated physical machine. In some embodiments, one or more additional VMs may run on guest VM 110. As used herein, a "resource" of a guest VM may include any modules executing on a guest VM or other data supported by the guest VM, such as drivers, OSs, applications, and other VMs.

Computing platform 100 may include MVM 118. MVM 118 may be associated with one or more vTPMs (such as vTPM 106), and may be configured to manage the lifecycles of the one or more vTPMs. In some embodiments, MVM 118 may store a private key for vTPMs with which it is associated (e.g., vTPM 106) and may be configured to use the private key to sign attestation certificates for the associated vTPMs so that the signed certificates may be used as proof of authentication when other computing platforms request verification of the security of, e.g., a resource of a guest VM such as guest VM 110.

MVM 118 may be disposed in SE 132. SE 132 may be a different SE than SE 134 (in which vTPM 106 is disposed). MVM 118 may communicate with vTPM 106 through management interface module 108 of vTPM 106. In some embodiments, communication between MVM 118 and management interface module 108 may take place through VMM 104. As discussed above, in some embodiments, MVM 118 may control which of PCRs 136 of vTPM 106 may be changed (e.g., by vRTM 120). In particular, MVM 118 may provide a modifier to vTPM 106 indicating that a particular one of PCRs 136 may or may not be changed, and consequently, that commands to vTPM 106 to change the particular one or more of PCRs 136 are or are not allowed. In some embodiments, vTPM 106 may only allow a change in value of a particular one of PCRs 136 after receiving a modifier from MVM 118 indicating that such a change is allowed. MVM 118 may only provide modifiers for allowing changes in PCR values under certain conditions: for example, when a lifecycle event associated with the guest VM occurs. In some embodiments, MVM 118 may communicate with vRTM 120 (discussed below). In some embodiments, MVM 118 and vRTM 120 may be included in a common SE; in some such embodiments, MVM 118 may be a vRTM and include the functionality of vRTM 120. In some embodiments, the modifierprovision functionality of MVM 118 may be included in vRTM 120, and vRTM 120 may provide modifiers to vTPMs (such as vTPM 106) via a secure channel. The foregoing embodiments may protect PCRs 136 from modification by malicious processes in, e.g., VMM 104, by only allowing modification of values in PCRs 136 upon allowance from MVM 118 in SE 132 (or vRTM 120 in SE 130). In some embodiments, MVM 118 may communicate with any of a number of support VMs 122 (discussed below).

Computing platform 100 may include vRTM 120. vRTM 120 may be configured to serve as an RTM for integrity measurements of resources of the VMs executing on VMM 104, such as guest VM 110. In some embodiments, vRTM 120 may be configured to initiate a chain of integrity measurements of a resource of a VM. An integrity measurement may include, for example, a hash of machine-readable code that defines the resource of the VM. In some embodiments, vRTM 120 may issue a command to vTPM 106 to store the hash value in one of PCRs 136 (e.g., in the one of PCRs 136 associated with the guest VM resource whose machine-readable code was hashed). In some embodiments, the command to store a hash value may be a command to extend an appropriate one of PCRs 136 with the hash value (when, for example, vTPM 120 initiates another chain of measurements after previously initiating and commanding the storage of integrity measurements of a previous chain).

vRTM 120 may be disposed in SE 130. SE 130 may be a different SE than SE 132 (in which MVM 118 is disposed) and SE 134 (in which vTPM 106 is disposed). As discussed above, computing device 100 may be configured to perform integrity measurements of one or more SEs, including SE 130. In some embodiments, measurements of SE 130 (and thus of vRTM 120) may be reported out from their initial storage in a measurement register associated with SE 130 and be extended into PCRs of each vTPM (such as PCRs 136 of vTPM 106). In some embodiments, vRTM 120 may communicate with vTPM 106 via guest interface module 108. In some embodiments, communication between vRTM 120 and vTPM 106 may take place through VMM 104. As noted above, in some embodiments, vTPM 106 may not be disposed in an SE, and in particular, may be disposed outside SE 130 in which vRTM 120 is disposed.

Computing platform may contain one or more support VMs 122. In some embodiments, support VMs 122 may provide services to vTPMs (such as vTPM 106) and guest VMs (such as guest VM 110). Examples of support VMs shown in FIG. 1 include migration agent VM 124, domain builder VM 126 and helper VM 128. In some embodiments, migration agent VM 124 may be configured to manage the migration of guest VMs (e.g., guest VM 110) by, for example, managing the copying of a guest VM from computing platform 100 to another computing platform to which the guest VM is being migrated, and deleting a copy of the guest VM after the guest VM has been migrated. In some embodiments, domain builder VM 126 may be configured to initialize environments for guest VMs (such as guest VM 110) by initializing the guest OSs for the guest VMs, allocating memory for the guest VMs, and/or other initialization tasks. Helper VM 128 may represent one or more support VMs that may provide services to guest VMs (such as guest VM 110), such as virtualized driver services. In some embodiments, one or more of support VMs 122 may be measured as part of a chain of integrity measurements between vRTM 120 and guest VM 110 (and consequently a chain of integrity measurements between vRTM 120 and resources of a guest VM associated with vTPM 106, such as resources of guest VM 110). In some embodiments, when vTPM 106 is not disposed in an SE, the chain of integrity measurements initiated by vRTM 120 may include a measurement of vTPM 106 itself: when vTPM 106 is disposed in an SE, the measurement of the SE in which vTPM 106 is disposed (e.g., SE 134) may service to validate vTPM 106.

Figure 2:
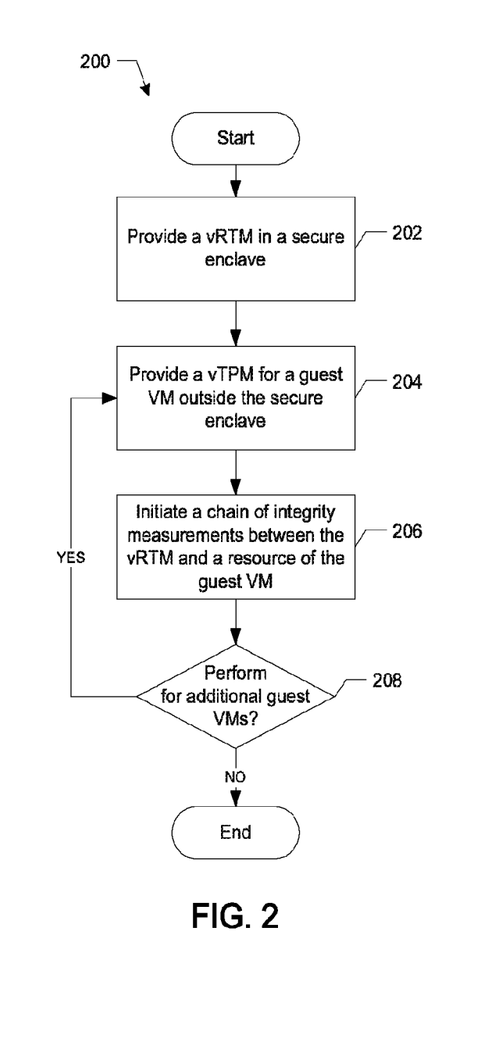
FIG. 2 is a flow diagram of an illustrative process for initiating a chain of integrity measurements between a vRTM in an SE and a resource of a guest VM, in accordance with various embodiments.

Referring now to FIG. 2, a flow diagram is provided of process 200 for initiating a chain of integrity measurements between a vRTM in an SE and a resource of a guest VM, in accordance with various embodiments. It may be recognized that, while the operations of process 200 (and the other processes described herein) are arranged in a particular order and illustrated once each, in various embodiments, one or more of the operations may be repeated, omitted or performed out of order. For illustrative purposes, operations of process 200 may be described as performed by computing platform 100, but the operations of process 200, including individual operations of process 200, may be performed by any suitably configured component or combination of components of computing platform 100.

Process 200 may begin at operation 202, in which computing platform 100 may provide a vRTM (such as vRTM 120) in an SE (such as SE 130). As discussed above, an SE may include a region of memory of computing platform 100 which is not accessible via executed instructions located outside the region of memory. In some embodiments, computing platform 100 may be configured to perform an integrity measurement of the first SE in which the vRTM is disposed.

At operation 204, computing platform 100 may provide a vTPM (such as vTPM 106) for a guest VM (such as guest VM 110) outside the SE in which the vRTM is disposed. In some embodiments, computing platform 100 may provide the vTPM in an SE (such as SE 134) at operation 204. The SE into which the vTPM may be provided at operation 204 may be different from the SE into which the vRTM is provided at operation 202.

At operation 206, computing platform 100 may initiate a chain of integrity measurements between the vRTM (of operation 202) and a resource of the guest VM (e.g., an application running on the guest VM). In some embodiments, the guest VM may be disposed outside the SE in which the vTPM is disposed. The chain of integrity measurements may include a measurement of the vTPM, and may include integrity measurement(s) of one or more support VMs that occur prior to the vTPM in the boot or other initialization sequence. For example, in some embodiments, one or more support VMs may be instantiated at a first time, and a guest VM using services provided by the support VMs may be instantiated at a second time weeks or months later. In such embodiments, the chain of integrity measurements may include integrity measurements of the support VMs performed at or around the first time, and integrity measurements of the guest VM performed at or around the second time.

At operation 208, computing platform 100 may determine whether there is an additional guest VM for which integrity measurements are to be performed. If yes, computing platform 100 may proceed to operation 204 and provide a vTPM for the additional guest VM, and continue as described above. If computing platform 100 determines at operation 208 that there are no additional guest VMs for which integrity measurements are to be performed, process 400 may then end. As noted above, the order of operations of process 400 is purely illustrative; for example, in some embodiments, vTPMs for all guest VMs may be established in parallel or subsequently, after which integrity measurements of guest VM resources may be made (again, in parallel or subsequently).

Figure 3:
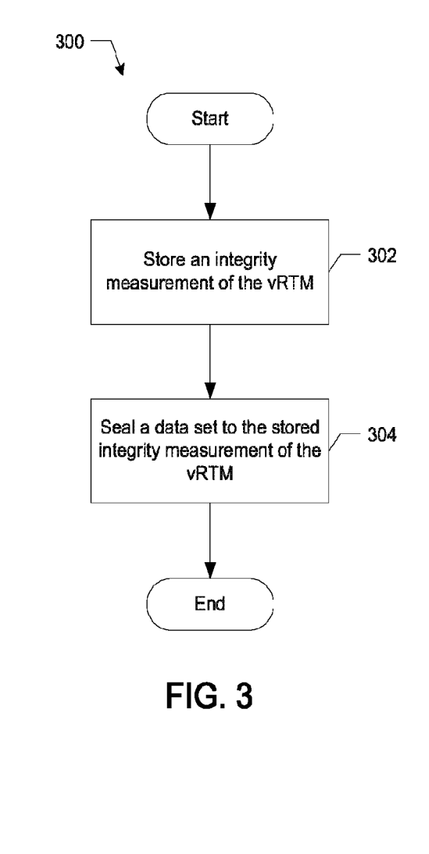
FIG. 3 is a flow diagram of an illustrative process for storing an integrity measurement of a vRTM, in accordance with various embodiments.

Referring now to FIG. 3, a flow diagram is provided of process 300 for storing an integrity measurement of a vRTM, in accordance with various embodiments. As discussed above with reference to vRTM 120 and SE 130, in some embodiments, computing platform 100 may be configured to perform an integrity measurement of an SE, such as an SE in which a vRTM is disposed. By performing an integrity measurement of an SE including a vRTM, and storing this integrity measurement in computing platform 100 (e.g., in hardware 102, firmware, or a location otherwise inaccessible by an OS of computing platform 100 and/or VMM 104), the chain of integrity measurements between the vRTM and a resource of a guest VM (e.g., as initiated at operation 206 of FIG. 2) may be rooted in computing platform 100 below VMM 104. This deeper rooting may improve the reliability of integrity measurements. Additionally, because the vRTM itself may be measured for integrity, it may be possible to detect tampering with the vRTM and thus further improve the security of computing platform 100. For illustrative purposes, operations of process 300 may be described as performed by computing platform 100, but the operations of process 300, including individual operations of process 300, may be performed by any suitably configured component or combination of components of computing platform 100.

Process 300 may begin at operation 302, in which computing platform 100 may store an integrity measurement of a vRTM (e.g., vRTM 120). In some embodiments, the integrity measurement of the vRTM may be performed by microcode, and computing platform 100 may store the integrity measurement of the vRTM in a hardware register associated with microcode of the SE in which the vRTM is disposed (e.g., microcode associated with SE 130). In some embodiments, computing platform 100 may also store the integrity measurement in one of PCRs 136 of vTPM 106.

At operation 304, computing platform 100 may seal a set of data to the integrity measurement of the vRTM stored at operation 302. As used here, "sealing a set of data to" an integrity measurement may refer to encrypting the set of data such that the set of data may only be decrypted when the integrity measurement indicates that the underlying measured component (such as a vRTM) has not changed since it was originally secured in an SE. In some embodiments, a set of data (such as a key) may be sealed to an integrity measurement of a vRTM to prevent decryption of that data unless the vRTM's integrity is first verified. For example, a set of data representing a password to a bank account may be sealed to an integrity measurement of a vRTM so that the password may only be decrypted when the integrity measurement of the vRTM is the same as an expected or initial value; otherwise, the vRTM may have been tampered with, and the password may remain encrypted. Process 300 may then end.

Figure 4:
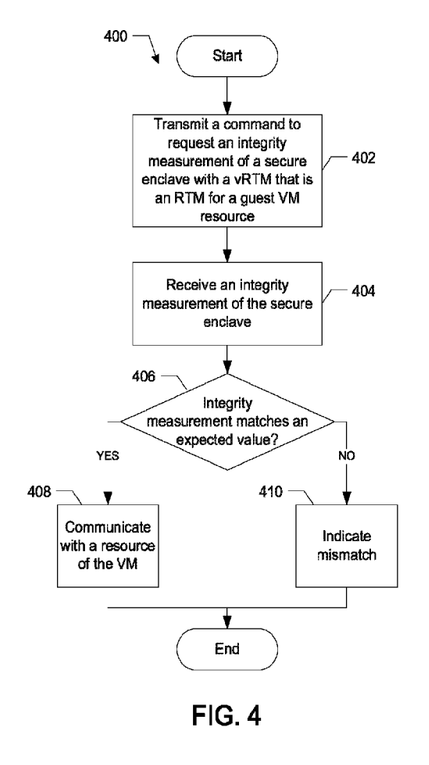
FIG. 4 is a flow diagram of an illustrative process for communicating with a computing platform having a vRTM in an SE, in accordance with various embodiments.

Referring now to FIG. 4, a flow diagram is provided of a process 400 for communicating with a computing platform having a vRTM in an SE (e.g., computing platform 100 having vRTM 120 in SE 130), in accordance with various embodiments. In some embodiments, process 400 may be performed by a first computing platform that wishes to confirm, for example, that a chain of integrity measurements made by a vRTM and stored in a vTPM, and a resource of a guest VM of a second computing platform indicates that the resource of the guest VM of the second computing platform has not been tampered with.

For example, in some embodiments, the first computing platform may be a bank or hospital server, and the second computing platform may contain financial or medical records; before the first computing platform exchanges sensitive information with the second computing platform, the first computing platform may wish to verify that particular resources of the second computing platform have not been compromised. In some embodiments, the first computing platform may wish to verify that the vRTM itself of the second computing platform has not been compromised. The first computing platform may be or include an entity (an application or an Internet server, as examples) that is external to the second computing platform, and may or may not be trusted by the second computing platform.

In the discussion of process 400 below, the second computing platform may be configured with a vRTM in a secure enclave in accordance with any of the embodiments described herein for computing platform 100. In some embodiments, the first computing platform may be configured as described herein for computing platform 100, or may be a general-purpose computing platform configured for communication with computing platforms like computing platform 100.

Process 400 may begin at operation 402, in which a first computing platform transmits a command, to a processing device of a second computing platform, to report an integrity measurement of an SE of the second computing platform that contains a vRTM (e.g., SE 130, which contains vRTM 120 of computing platform 100). As discussed above, the vRTM in the SE may be configured as a RTM for a chain of integrity measurements between the vRTM and a resource of a guest VM of the second computing platform (e.g., guest VM 110 of computing platform 100). In some embodiments, the guest VM may be disposed outside the SE containing the vRTM.

At operation 404, the first computing platform may receive, from the second computing platform, an integrity measurement of the SE containing the vRTM. In some embodiments, the integrity measurement may be transmitted from the vTPM of the second computing platform (for example, as retrieved from one or more of PCRs 136 of vTPM 106). In some embodiments, the integrity measurement of the SE received at operation 404 may be cryptographically signed with a key associated with the second computing platform. For example, the key may be a hardware platform key that may be verifiable by a trusted party (e.g., the manufacturer of one or more components of the hardware). Using the cryptographic signature, the first computing platform may confirm that the integrity measurement was reported from the correct computing platform, and was not tampered with en route.

At operation 406, the first computing platform may compare the integrity measurement of the SE (as received at operation 404) to an expected value. In some embodiments, the expected value may be based on an expected set of machine-readable code defining the vRTM. For example, the expected value may be a hash of an expected set of machine-readable code defining the vRTM. If the first computing platform determines at operation 406 that the integrity measurement of the SE does not match the expected value, the first computing platform may proceed to operation 410 and provide an indicator of the mismatch to another component of the first computing platform (e.g., security event logging software), another computing platform (e.g., a security event logging server), and/or the second computing platform (e.g., to notify it of potential security breach). Process 400 may then end.

If the first computing platform determines at operation 406 that the integrity measurement of the SE matches the expected value, the first computing platform may proceed to operation 408 and communicate with the resource of the guest VM of the second computing platform. In some embodiments, prior to communicating with the resource of the guest VM of the second computing platform at operation 408, the first computing platform may determine whether data representative of a chain of integrity measurements between the vRTM and the resource of the guest VM of the second computing platform (e.g., one or more hash values of the integrity measurements of the chain) matches an expected value or values, and may only proceed to communicate with the resource of the guest VM of the second computing platform upon confirming a match. Process 400 may then end.

Figure 5:
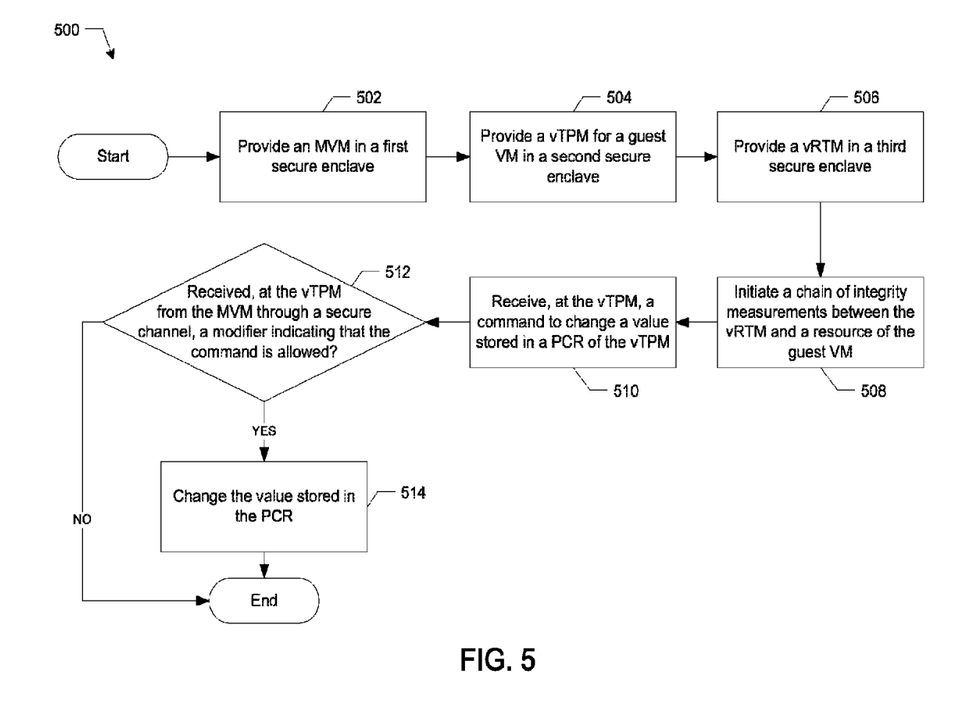
FIG. 5 is a flow diagram of an illustrative process for modifying values stored in a platform configuration register, in accordance with various embodiments.

Referring now to FIG. 5, a flow diagram is provided of process 500 for modifying values stored in a PCR (such as any of PCRs 136), in accordance with various embodiments. For illustrative purposes, operations of process 500 may be described as performed by computing platform 100, but the operations of process 500, including individual operations of process 500, may be performed by any suitably configured component or combination of components of computing platform 100.

Process 500 may begin at operation 502, in which computing platform 100 may provide an MVM (such as MVM 118) in a first SE of computing platform 100 (such as SE 132). At operation 504, computing platform 100 may provide a vTPM (such as vTPM 106), for a guest VM (such as guest VM 110), in a second SE (such as SE 134) of computing platform 100. The second SE (of operation 504) may be different from the first SE (of operation 502). At operation 506, computing platform 100 may provide a vRTM (such as vRTM 120) in a third SE of computing platform 100 (such as SE 130), the third SE different from the first and second SEs. In some embodiments, the MVM provided at operation 502 may include a vRTM (e.g., the functionality of vRTM 120), and thus operation 506 may not be performed.

At operation 508, computing platform 100 may initiate a chain of integrity measurements between a vRTM (e.g., vRTM 120 or a vRTM included in MVM 118) and a resource of the guest VM. At operation 510, computing platform 100 may receive, at the vTPM (provided at operation 504), a command to change a value stored in a PCR of the vTPM, the PCR associated with a resource of a guest VM. In some embodiments, the command to change the value stored in the PCR may be made in response to the chain of integrity measurements initiated at operation 508. In some embodiments, the command to change the value stored in the PCR may not arise from integrity measurements, but may arise from another source (e.g., another process). In some embodiments, the command received at operation 510 may include a command to extend the value stored in the PCR with a cryptographic hash of an integrity measurement of a guest VM resource associated with the PCR. The command received at operation 510 may depend on the configuration of the PCR; for example, some PCRs may be initialized to a value only upon vTPM reset, or may only be extended rather than set to an arbitrary value.

At operation 512, computing platform 100 may determine whether a modifier has been received at the vTPM from the MVM indicating that the change command (received at operation 510) is allowed. In some embodiments, the MVM and the vTPM may communication at operation 512 through a secure channel. Since each of the MVM and the vTPM are disposed in secure enclaves (and can therefore be verified and trusted), any of a number of techniques known in the art for establishing a secure channel between two trusted points may be used to establish a secure channel between the MVM and the vTPM. In some embodiments, a modifier may be representative of a lifecycle event of a guest VM associated with the PCR. If no suitable modifier has been received, process 500 may end and no change may be made to the PCR. If computing platform 100 determines at operation 510 that a modifier has been received, computing platform 100 may proceed to operation 514 and change the value stored in the PCR. Process 500 may then end.

Figure 6:
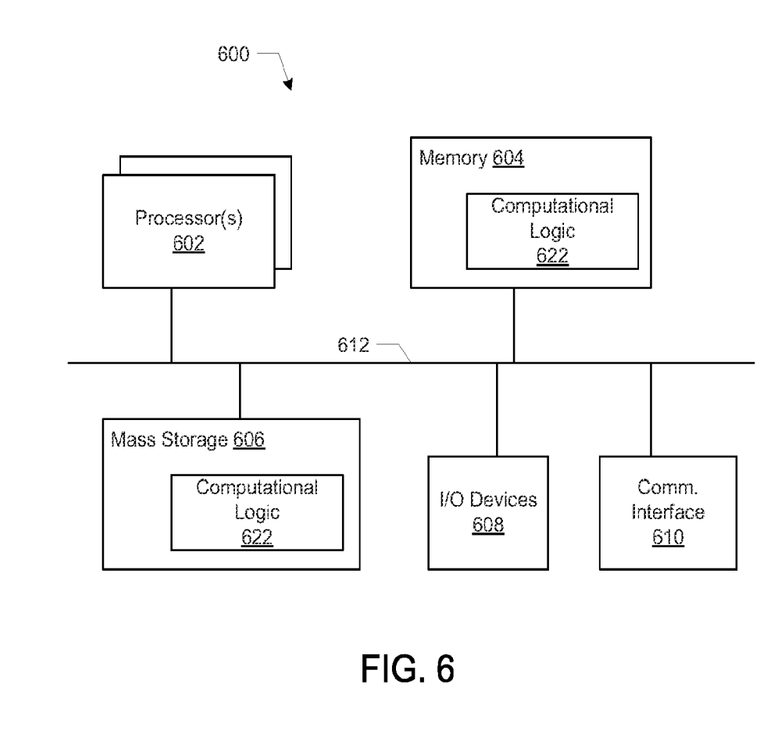
FIG. 6 is a block diagram of an illustrative computing platform suitable for practicing the disclosed embodiments, in accordance with various embodiments.

Referring now to FIG. 6, a block diagram is provided of example computing platform 600 suitable for practicing the disclosed embodiments (e.g., the embodiments discussed above with reference to computing platform 100 of FIG. 1, and the first and second computing platforms discussed above with reference to FIG. 4). Computing platform 600 may include, or be part of, any of a number of computing systems, such as a desktop computer, a portable computer, a tablet computer, a server, a client, a thin client, a cellular telephone, or a smartphone, for example.

As shown, computing device 600 includes a number of processing devices 602, and system memory 604. Processing devices 602 may include one or more processing cores or other processing devices. Additionally, computing platform 600 may include mass storage devices 606 (such as solid-state drive, diskette, hard drive, compact disc read only memory (CDROM) and so forth), input/output devices 608 (such as display, keyboard, cursor control, camera, microphone, GPS receiver, motion detectors, and so forth) and communication interfaces 610 (such as network interface cards, modems, WiFi devices, Bluetooth devices, and so forth). The elements may be coupled to each other via system bus 612, which represents one or more buses. In the case of multiple buses, they may be bridged by one or more bus bridges (not shown). The techniques and systems described herein may be used to secure resources of computing platform against vulnerabilities introduced through any one or more of these devices or pathways.

Each of these elements may perform its conventional functions known in the art. In particular, system memory 604 and mass storage 606 may be employed to store a working copy and a permanent copy of the programming instructions implementing the method of any of FIGS. 2-5, or portions thereof, when executed by the respective processing devices 602, herein collectively denoted as computational logic 622. The various components may be implemented by assembler instructions supported by processing devices 602 or high-level languages, such as, for example, C, that can be compiled into such instructions.

The permanent copy of the programming instructions may be placed into permanent storage 606 in the factory, or in the field, through, for example, a machine-accessible distribution medium (not shown), such as a compact disc (CD), or through communication interface 610 (e.g., tiom a distribution server (not shown)). That is, one or more distribution media having an implementation of the agent program may be employed to distribute the agent and program various computing devices. The constitution of elements 602-612 are known, and accordingly will not be further described.

Machine-accessible media (including non-transitory machine readable media), methods, systems and devices for performing the above-described techniques are illustrative examples of embodiments disclosed herein. Additionally, other devices in the above-described interactions may be configured to perform various disclosed techniques.

EXAMPLES

Example 1A is a method for initiating a chain of integrity measurements on a computing platform including: providing, to a computing platform, a vRTM in a first secure enclave of the computing platform, wherein the computing platform is configured to perform an integrity measurement of the second secure enclave; providing, to the computing platform, a vTPM, for a guest VM, outside of the first secure enclave; and initiating, on the computing platform, a chain of integrity measurements between the vRTM and a resource of the guest VM.

Example 1B may include the subject matter of Example 1A, and further specifies that the first secure enclave includes a region of memory of the computing platform, the region of memory not accessible via executed instructions located outside the region of memory.

Example 1C may include the subject matter of any of Examples 1A-1B, further including storing, in the vTPM, an integrity measurement of the chain of integrity measurements between the vRTM and the resource of the guest VM.

Example 1D may include the subject matter of Examples 1A-1C, and further specifies that providing, to the computing platform, a vTPM, for a guest VM, outside of the first secure enclave includes providing, to the computing platform, a vTPM, for a guest VM, in a second secure enclave of the computing platform, wherein the second secure enclave is different from the first secure enclave.

Example 1E may include the subject matter of Example 1D, and further specifies that the guest VM is outside the second secure enclave.

Example 1F may include the subject matter of any of Examples 1A-1E, and further specifies that the chain of integrity measurements includes an integrity measurement of the vTPM.

Example may include the subject matter of Example 1F, and further specifies that the chain of integrity measurements includes an integrity measurement of a support VM that provides a service to the guest VM.

Example 1H may include the subject matter of any of Examples 1A-1G, and further specifies that configured to perform an integrity measurement of the first secure enclave includes having microcode associated with the first secure enclave configured to perform the integrity measurement of the first secure enclave and store the integrity measurement of the first secure enclave in a hardware register.

Example 1I may include the subject matter of any of Examples 1A-1H, and further specifies that the vTPM is a first vTPM, the guest VM is a first guest VM, and the method further includes: providing to the computing platform, a second vTPM for a second guest VM; and initiating on the computing platform, a chain of integrity measurements between the vRTM and a resource of the second guest VM.

Example 1J is one or more machine readable media including instructions that, in response to execution by a processing device of a computing platform, cause the computing platform to perform the method of any of Examples 1A-1I.

Example 1K is an apparatus including one or more processing devices and one or more machine readable media including instructions that, in response to execution by the one or more processing devices, cause the apparatus to perform the method of any of Examples 1A-1I.

Example 1L is an apparatus including one or more means for performing the operations of the method of any of Examples 1A-1I.

Example 2A is a method for computing including: providing to a computing platform, an MVM in a first secure enclave of the computing platform; providing to a computing platform, a vTPM for a guest VM for the computing platform, the vTPM being provided in a second secure enclave of the computing platform different from the first secure enclave; receiving, at the vTPM, a command to change a value stored in a PCR of the vTPM; receiving, at the vTPM from the MVM through a secure channel, a modifier indicating that the command is allowed; and after receiving the modifier, changing, by the computing platform, the value stored in the PCR.

Example 2B may include the subject matter of Example 2A, and further specifies that the modifier is representative of a lifecycle event of a VM associated with the PCR.

Example 2C may include the subject matter of any of Examples 2A-2B, and further specifies that the command to change the value stored in the PCR is a command to extend the value stored in a PCR with a cryptographic hash of an integrity measurement of a VM resource associated with the PCR.

Example 2D may include the subject matter of any of Examples 2A-2C, and further specifies that the MVM includes a vRTM.

Example 2E may include the subject matter of any of Examples 2A-2D, and further includes: providing to the computing platform, a vRTM in a third secure enclave of the computing platform, wherein the third secure enclave is different from the first and second secure enclaves: and initiating on the computing platform, a chain of integrity measurements between the vRTM and a resource of the guest VM.

Example 2F is one or more machine readable media including instructions that, in response to execution by a processing device of a computing platform, cause the computing platform to perform the method of any of Examples 2A-2E.

Example 2G is an apparatus including one or more processing devices and one or more machine readable media including instructions that, in response to execution by the one or more processing devices, cause the apparatus to perform the method of any of Examples 2A-2E.

Example 2H is an apparatus including one or more means for performing the operations of the method of any of Examples 2A-2E.

Example 3A is a method for receiving an integrity measurement including: transmitting, by a first computing platform, a command to a processing device of a second computing platform to report an integrity measurement a secure enclave of the second computing platform, wherein the secure enclave contains a vRTM configured as a root-of-trust for measurement for a chain of integrity measurements between the vRTM and a resource of a guest VM disposed outside the secure enclave; and receiving, from the second computing platform, by the first computing platform, an integrity measurement of the secure enclave.

Example 3B may include the subject matter of Example 3A, and further includes comparing, by the first computing platform, the integrity measurement of the secure enclave to an expected value.

Example 3C may include the subject matter of Example 3B, and further includes communicating, by the first computing platform, with the resource of the guest VM, in response to a result of the comparison that indicates the integrity measurement of the secure enclave matches the expected value.

Example 3D may include the subject matter of any of Examples 3B-3C, and further specifies that the expected value is based on an expected set of machine-readable code defining the vRTM.

Example 3E may include the subject matter of any of Examples 3A-3D, and further specifies that the integrity measurement of the secure enclave is signed with a key associated with the computing platform.

Example 3F is one or more machine readable media including instructions that, in response to execution by a processing device of a computing platform, cause the computing platform to perform the method of any of Examples 3A-3E.

Example 3G is an apparatus including one or more processing devices and one or more machine readable media including instructions that, in response to execution by the one or more processing devices, cause the apparatus to perform the method of any of Examples 3A-3E.

Example 3H is an apparatus including one or more means for performing the operations of the method of any of Examples 3A-3E.

What is claimed is:

1. An apparatus for computing, comprising:
   a processor; and
   memory coupled with the processor, with instructions stored therein, wherein the instructions are configured to be operated by the processor to cause the apparatus to:
   provide a management virtual machine (MVM) in a first secure enclave of the apparatus;
   provide a virtual machine trusted platform module (vTPM) for a guest virtual machine (VM) of the apparatus, the vTPM being provided in a second secure enclave of the apparatus different from the first secure enclave;
   receive, at the vTPM, a command to change a value stored in a platform configuration register (PCR) of the vTPM;
   receive, at the vTPM from the MVM through a secure channel, a modifier indicating that the command is allowed;
   after receiving the modifier, change the value stored in the PCR;
   provide a virtual machine root-of-trust for measurement (vRTM) in a third secure enclave of the apparatus, wherein the third secure enclave is different from the first and second secure enclaves; and
   initiate, a chain of integrity measurements between the vRTM and a resource of the guest VM.

2. The apparatus of claim 1, wherein the modifier is representative of a lifecycle event of a VM associated with the PCR.

3. The apparatus of claim 1, wherein the command to change the value stored in the PCR is a command to extend the value stored in a PCR with a cryptographic hash of an integrity measurement of a VM resource associated with the PCR.

4. The apparatus of claim 1, wherein the MVM includes a virtual machine root-of-trust for measurement (vRTM).

5. One or more non-transitory machine readable media comprising instructions that, in response to execution by a processing device of a computing platform, cause the computing platform to:
   provide to the computing platform, a virtual machine root-of-trust for measurement (vRTM) in a first secure enclave of the computing platform, wherein the computing platform is configured to perform an integrity measurement of the first secure enclave;
   provide, to the computing platform, a virtual machine trusted platform module (vTPM), for a guest virtual machine (VM), in a second secure enclave different from the first secure enclave; and
   initiate, on the computing platform, a chain of integrity measurements between the vRTM and a resource of the guest VM, wherein the chain of integrity measurements includes one or more integrity measurements of the vTPM.

6. The one or more storage media of claim 5, wherein the first secure enclave comprises a region of memory of the computing platform, the region of memory not accessible via executed instructions located outside the region of memory.

7. The one or more storage media of claim 5, wherein the computing platform is further caused to:
   store, in the vTPM, an integrity measurement of the chain of integrity measurements between the vRTM and the resource of the guest VM.

8. The one or more storage media of claim 5, wherein the guest VM is outside the second secure enclave.

9. The one or more storage media of claim 5, wherein the chain of integrity measurements comprises an integrity measurement of the vTPM.

10. The one or more storage media of claim 9, wherein the chain of integrity measurements comprises an integrity measurement of a support VM that provides a service to the guest VM.

11. The one or more storage media of claim 5, wherein configured to perform an integrity measurement of the first secure enclave comprises having microcode associated with the first secure enclave configured to perform the integrity measurement of the first secure enclave and store the integrity measurement of the first secure enclave in a hardware register.

12. The one or more storage media of claim 5, wherein the vTPM is a first vTPM and the guest VM is a first guest VM, wherein the computing platform is further caused to:
   provide to the computing platform, a second vTPM for a second guest VM; and
   initiate on the computing platform, a chain of integrity measurements between the vRTM and a resource of the second guest VM.

13. One or more non-transitory machine readable media comprising instructions that, in response to execution by a processing device of a first computing platform, cause the first computing platform to:
   transmit a command to a processing device of a second computing platform to report an integrity measurement of a secure enclave of the second computing platform, wherein the secure enclave contains a virtual machine root-of-trust for measurement (vRTM) configured as a root-of-trust for measurement for a chain of integrity measurements between the vRTM and a resource of a guest virtual machine (VM) disposed outside the secure enclave, wherein the chain of integrity measurements includes one or more integrity measurements of a virtual machine trusted platform module (vTPM), for the guest virtual machine (VM);
   receive, from the second computing platform, an integrity measurement of the secure enclave;
   compare the integrity measurement of the secure enclave to an expected value; and
   communicate with the resource of the quest VM, in response to a result of the comparison that indicates the integrity measurement of the secure enclave matches the expected value.

14. The one or more storage media of claim 13, wherein the expected value is based on an expected set of machine-readable code defining the vRTM.

15. The one or more storage media of claim 13, wherein the integrity measurement of the secure enclave is signed with a key associated with the computing platform.

16. A method for initiating a chain of integrity measurements on a computing platform, comprising:
   providing, to the computing platform, a virtual machine root-of-trust for measurement (vRTM) in a first secure enclave of the computing platform, wherein the computing platform is configured to perform an integrity measurement of the first secure enclave;
   providing, to the computing platform, a virtual machine trusted platform module (vTPM), for a guest virtual machine (VM), in a second secure enclave different from the first secure enclave; and initiating, on the computing platform, a chain of integrity measurements between the vRTM and a resource of the guest VM, wherein the chain of integrity measurements includes one or more integrity measurements of the vTPM.

17. The method of claim 16, further comprising:

storing, in the vTPM, an integrity measurement of the chain of integrity measurements between the vRTM and the resource of the guest VM.

\* \* \* \* \*